United States Patent
Skovby et al.

(10) Patent No.: US 11,591,272 B2
(45) Date of Patent: Feb. 28, 2023

(54) MICRONIZED EARTH ALKALI CARBONATE-CONTAINING MATERIAL, FOR REGULATING THE PH OF A SOIL

(71) Applicant: Omya International AG, Oftringen (CH)

(72) Inventors: Michael Skovby, Meilen (CH); Domenico Zocco, Zürich (CH); Steven Edward Durand, Apple Valley, CA (US)

(73) Assignee: Omya International AG, Oftringen (CH)

( * ) Notice: Subject to any disclaimer, the term of this patent is extended or adjusted under 35 U.S.C. 154(b) by 5 days.

(21) Appl. No.: 14/917,078

(22) PCT Filed: Sep. 30, 2014

(86) PCT No.: PCT/EP2014/070884
§ 371 (c)(1),
(2) Date: Mar. 7, 2016

(87) PCT Pub. No.: WO2015/049219
PCT Pub. Date: Apr. 9, 2015

(65) Prior Publication Data
US 2016/0207843 A1    Jul. 21, 2016

(30) Foreign Application Priority Data

Oct. 4, 2013 (EP) .................................. 13187392

(51) Int. Cl.
| | |
|---|---|
| *C05D 3/02* | (2006.01) |
| *A01C 23/04* | (2006.01) |
| *A01G 25/00* | (2006.01) |
| *A01G 25/02* | (2006.01) |
| *C05D 5/00* | (2006.01) |
| *C09K 17/06* | (2006.01) |

(52) U.S. Cl.
CPC .............. *C05D 3/02* (2013.01); *A01C 23/042* (2013.01); *A01G 25/00* (2013.01); *A01G 25/02* (2013.01); *C05D 5/00* (2013.01); *C09K 17/06* (2013.01)

(58) Field of Classification Search
CPC .......... C05D 3/02; C05D 5/00; A01C 23/042; A01G 25/00; A01G 25/02; C09K 17/06
See application file for complete search history.

(56) References Cited

U.S. PATENT DOCUMENTS

| | | | |
|---|---|---|---|
| 3,798,020 A * | 3/1974 | Parham, Jr. ............... | C05G 5/20 71/1 |
| 7,695,541 B1 * | 4/2010 | Frizzell ..................... | C05B 1/04 71/11 |

(Continued)

FOREIGN PATENT DOCUMENTS

| | | | |
|---|---|---|---|
| AU | 691460 B3 * | 5/1998 | |
| DE | 69825850 T2 | 9/2005 | |

(Continued)

OTHER PUBLICATIONS

López-Periago, Ana M., et al. "A breakthrough technique for the preparation of high-yield precipitated calcium carbonate." The Journal of Supercritical Fluids 52.3 (2010): 298-305.*

(Continued)

*Primary Examiner* — Trevor Love
(74) *Attorney, Agent, or Firm* — Schwegman Lundberg & Woessner, P.A.

(57) ABSTRACT

The present invention relates to a method for regulating the pH of a soil as well as the use of at least one earth alkali carbonate-containing material having a weight median particle size $d_{50}$ value of $\leq 50.0$ μm for optimizing or improving the pH of a soil as well as the use of an irrigation or spraying system for the application of an aqueous suspension comprising at least one earth alkali carbonate-containing material in order to optimize or improve the pH of a soil.

19 Claims, 2 Drawing Sheets

(56) References Cited

U.S. PATENT DOCUMENTS

Figure 1:
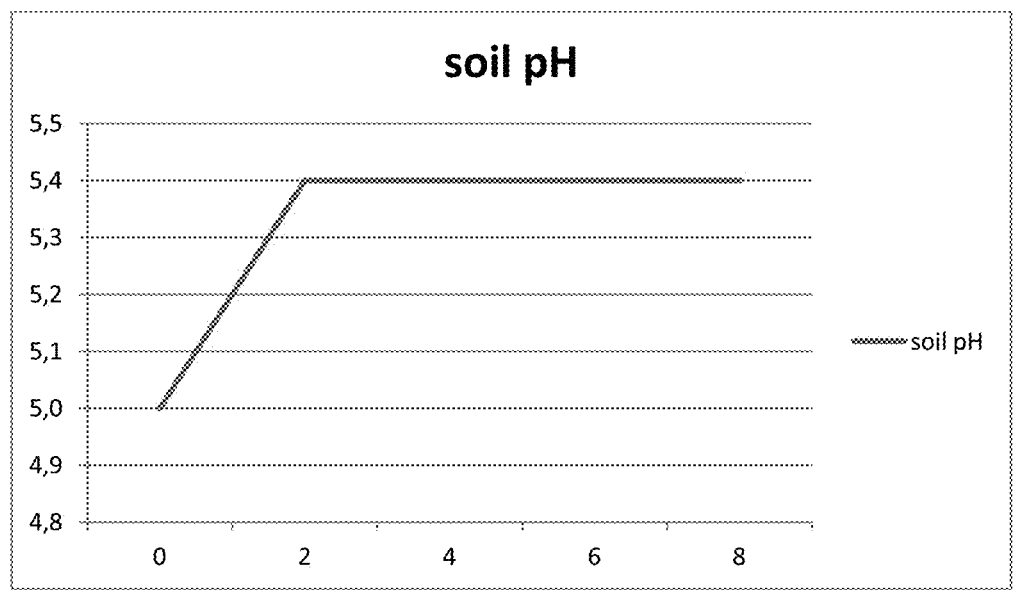

| | | | |
|---|---|---|---|
| 2001/0030029 A1 | 10/2001 | Olsen et al. | |
| 2008/0066509 A1* | 3/2008 | Turley | C09K 17/40 71/27 |
| 2008/0219912 A1 | 9/2008 | Olsen et al. | |
| 2011/0139695 A1 | 6/2011 | Borden | |
| 2011/0217214 A1 | 9/2011 | Olsen et al. | |

FOREIGN PATENT DOCUMENTS

| | | | |
|---|---|---|---|
| EP | 0924176 A1 * | 6/1999 | C05D 3/02 |
| EP | 0924176 A1 | 6/1999 | |
| WO | 0170648 A1 | 9/2001 | |

OTHER PUBLICATIONS

Domka, Ludwik, A. Morawska, and T. Jesionowski. "Determination of particle size distributions and surface properties of unmodified and modified natural chalk." Prace Naukowe Instytutu Górnictwa Politechniki Wrocławskiej. Konferencje 95.31 (2001): 75-94.*
Hoyt, Hazen L., and Herman L. Gewanter. "Citrate." Detergents. Springer, Berlin, Heidelberg, 1992. 229-242.*
International Search Report dated Oct. 23, 2014 for PCT Application No. PCT/EP2014/070884.
Written Opinion of the International Searching Authority dated Oct. 23, 2014 for PCT Application No. PCT/EP2014/070884.

* cited by examiner

MICRONIZED EARTH ALKALI CARBONATE-CONTAINING MATERIAL, FOR REGULATING THE PH OF A SOIL

CROSS-REFERENCE TO RELATED APPLICATIONS

This is a U.S. national phase of PCT Application No. PCT/EP2014/070884, filed Sep. 30, 2014, which claims priority to European Application No. 13187392.9, filed Oct. 4, 2013.

The present invention relates to a method for regulating the pH of a soil as well as the use of at least one earth alkali carbonate-containing material having a weight median particle size $d_{50}$ value of $\leq 50.0$ μm for optimizing or improving the pH of a soil as well as the use of an irrigation or spraying system for the application of an aqueous suspension comprising at least one earth alkali carbonate-containing material in order to optimize or improve the pH of a soil.

The cultivation of domesticated plants impacts several factors such as the pH of the soil to be used in numerous ways. For example, it is calculated that approximately 600 000 acres in California are planted with Walnut trees and thus it is one of the most cultivated plants in California. In general, California is known to have a pH neutral soil environment but the acidity increases when, during the planting of the young trees, the bed rock is broken and acidity brought up and released from granitic rocks affects the top soil. As a consequence, at least 10% of the total area used to cultivate walnut suffers from high acidity. The reasons for this soil imbalance not being corrected easily are mainly based on the poor control of preparatory work prior to and during the planting and cultivation.

In the art, several attempts have been made to increase the pH of the soil. For example, liming either with calcium carbonate or with dolomite based products is a common practice to increase the soil pH. However, the standard lime is applied on the soil surface with a high risk of an uncontrolled distribution of its dust caused by the wind. According to the local experience, a high amount of dolomite or calcium carbonate based products, i.e. 10 tons/acres over 2 years, is thus required to increase the pH from 5.0 to 5.2. Furthermore, the enormous application rate is due to the fact that a standard lime does not react at a soil pH of 5. Growers are overcoming this problem by increasing drastically the rates per acre.

For example, WO 01/70648 A1 refers to the use of a hygroscopic mineral additive as dust free additive for powder products and compositions, in particular for soil amendment or soil amendment fertilizers such as in particular raw soil amendment products or raw soil amendment products mixed with trisodium phosphate (TSP), potassium chloride and/or natural phosphate or the like.

Furthermore, EP 0 924 176 B1 refers to basic liquid soil conditioners comprising an aqueous suspension of calcium carbonate or dolomite or their mixtures, or extremely fine magnesium oxide. It is further disclosed that application rates are in the range from 2 to 6 tonnes/hectare (t/ha).

Thus, there is still a need in the art for providing alternative methods for effectively regulating the pH of a soil, wherein such method should be simple and inexpensive, while avoiding high application rates of acidity regulating materials, and should provide the possibility of increasing or optimizing the pH of the soil to be treated. Furthermore, the increase or optimization of the soil pH shall last for a sufficient period of time, preferably a period of at least 6 months.

Accordingly, it is an objective of the present invention to provide an alternative method for regulating the pH of a soil. Another objective of the present invention may be seen in the provision of a method for regulating the pH of a soil in that the pH is increased or optimized. A further objective of the present invention may be seen in the provision of a method for regulating the pH of a soil being applicable at a low application rate of pH soil conditioner materials. Another objective of the present invention may be seen in the provision of a method for regulating the pH of a soil which can be distributed in a simple way by using available equipment. A still further objective of the present invention may be seen in the provision of a method for regulating the pH of a soil, in which the pH soil conditioner material can be efficiently applied on the soil. An even further objective of the present invention may be seen in the provision of a method which effect lasts for a sufficient period of time, preferably a period of at least 6 months. Further objectives can be gathered from the following description of the invention.

The foregoing and other objectives are solved by the subject-matter as defined herein in claim 1.

Advantageous embodiments of the inventive method for regulating the pH of a soil are defined in the corresponding sub-claims.

According to one aspect of the present application, a method for regulating the pH of a soil is provided, the method comprising the steps of:

a) providing at least one earth alkali carbonate-containing material having a weight median particle size $d_{50}$ value of $\leq 50.0$ μm, b) providing an aqueous solution, c) contacting the at least one earth alkali carbonate-containing material of step a) with the aqueous solution of step b) such as to form an aqueous suspension comprising the at least one earth alkali carbonate-containing material, and d) applying the aqueous suspension obtained in step c) on and/or into soil through an irrigation or spraying system, wherein the aqueous suspension is applied on and/or into the soil in an amount from 1.0 to 250.0 kg/ha, based on the at least one earth alkali carbonate-containing material per pH increase of 0.1 of the soil.

The inventors surprisingly found out that the foregoing method for regulating the pH of a soil avoids the use of high application rates of earth alkali carbonate-containing materials and can be effectively applied to the soil in a simple way and without using expensive equipment and leads to a soil in which the pH is increased or became optimized for a sufficient period of time. More precisely, the inventors found out that the pH of a soil can be improved or optimized by the application of a defined aqueous suspension comprising at least one earth alkali carbonate-containing material on and/or into the soil.

It should be understood that for the purposes of the present invention, the following terms have the following meanings:

For the purpose of the present invention, the term "earth alkali carbonate-containing material" refers to a material that comprises at least 40.0 wt.-% earth alkali carbonate, based on the total dry weight of the earth alkali carbonate-containing material. Preferably, the material comprises at least 60.0 wt.-% and more preferably at least 80.0 wt.-% earth alkali carbonate, based on the total dry weight of the earth alkali carbonate-containing material.

The term "earth alkali" carbonate-containing material or "earth alkali" carbonate in the meaning of the present invention refers to the divalent cations of the earth alkali metals, like magnesium ions, calcium ions, strontium ions or mixtures thereof, preferably magnesium ions, calcium ions or mixtures thereof, more preferably calcium ions.

The term "aqueous solution" in the meaning of the present invention refers to a system comprising water and optionally further additives, wherein no discrete solid particles are observed in the water.

The term "aqueous suspension" in the meaning of the present invention comprises insoluble solids and water and optionally further additives and usually contains large amounts of solids and, thus, is more viscous and generally of higher density than the liquid from which it is formed.

As used herein and as generally defined in the art, the "$d_{50}$" value is determined based on measurements made by using a Sedigraph™ 5100 of Micromeritics Instrument Corporation (operating instrument software version 1.04) and is defined as the size at which 50% (the median point) of the particle volume or mass is accounted for by particles having a diameter equal to the specified value. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and ultrasonics.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

According to another aspect of the present invention, the use of the at least one earth alkali carbonate-containing material having a weight median particle size $d_{50}$ value of ≤50.0 μm for optimizing or improving the pH of a soil is provided, wherein the at least one earth alkali carbonate-containing material is in form of an aqueous suspension comprising the at least one earth alkali carbonate-containing material and the aqueous suspension is applied on and/or into the soil in an amount from 1.0 to 250.0 kg/ha, based on the at least one earth alkali carbonate-containing material per pH increase of 0.1 of the soil.

According to a further aspect of the present invention, the use of an irrigation or spraying system for the application of an aqueous suspension comprising the at least one earth alkali carbonate-containing material on and/or into soil in order to optimize or improve the pH of the soil is provided, wherein the irrigation system is selected from drip irrigation, fertigation, sprinklers, pivots, distribution with booms and mixtures thereof.

It is preferred that the at least one earth alkali carbonate-containing material is selected from at least one magnesium carbonate-containing material, at least one calcium carbonate-containing material and mixtures thereof, preferably the at least one calcium carbonate-containing material is selected from precipitated calcium carbonate (PCC), like one or more of the aragonitic, vateritic and calcitic mineralogical crystal forms, and/or natural ground calcium carbonate (NGCC), like one or more of marble, limestone, chalk, and/or dolomite.

It is also preferred that the at least one earth alkali carbonate-containing material has a) a weight median particle size diameter $d_{50}$ in the range from 0.1 μm to 50.0 μm, preferably from 0.2 μm to 30.0 μm, more preferably from 0.3 μm to 20.0 μm and most preferably from 0.5 μm to 15.0 μm, and/or b) a specific surface area (BET) in the range from 1.0 $m^2/g$ to 10.0 $m^2/g$ and more preferably in the range from 3.0 $m^2/g$ to 8.0 $m^2/g$ as measured by the BET nitrogen method, and/or c) a density in the range from 2.5 to 3.5 $g/cm^3$, more preferably in the range from 2.5 to 3.2 $g/cm^3$ and most preferably in the range from 2.6 to 3.0 $g/cm^3$. It is further preferred that the aqueous suspension is applied on and/or into the soil in an amount from 1.0 to 250 kg/ha, preferably from 1.0 to 100.0 kg/ha, based on the at least one earth alkali carbonate-containing material, per pH increase of 0.1 of the soil. It is also preferred that the aqueous solution further comprises at least one compound selected from the group comprising fertilizer, soil conditioner, bactericide, fungicide, insecticide, herbicide, anti-evaporation agent, anti-freezing agent, buffering agent, water softener and mixtures thereof. It is even further preferred that the optimization or improvement is accomplished when the soil has a) a pH, before applying the at least one earth alkali carbonate-containing material, of in-equation (I) and more preferably of in-equation (Ia), $$pH \leq 7.2 \tag{I}$$

$$3.5 < pH \leq 7.0 \tag{Ia}$$

and b) a pH, after applying the at least one earth alkali carbonate-containing material, of in-equation (II) and more preferably of in-equation (IIa), $$pH \leq 7.2 \tag{II}$$

$$5.1 < pH \leq 7.2 \tag{IIa}$$

wherein the pH is determined after 2, 4, 6, 8, 24 and/or 52 weeks of applying the at least one earth alkali carbonate-containing material on and/or into the soil. It is also preferred that the at least one earth alkali carbonate-containing material is applied on and/or into a soil for domesticated plants such as top fruits, small-plant fruits, crops, legumes, vegetables either open field or green house, industrial crops, commodities, ornamental plants and the like.

According to one embodiment of the present invention, the at least one earth alkali carbonate-containing material is selected from at least one magnesium carbonate-containing material, at least one calcium carbonate-containing material and mixtures thereof, preferably the at least one calcium carbonate-containing material is selected from precipitated calcium carbonate (PCC), like one or more of the aragonitic, vateritic and calcitic mineralogical crystal forms, and/or natural ground calcium carbonate (NGCC), like one or more of marble, limestone, chalk, and/or dolomite.

According to another embodiment of the present invention, the at least one earth alkali carbonate-containing material has a) a weight median particle size diameter $d_{50}$ in the range from 0.1 μm to 50.0 μm, preferably from 0.2 μm to 30.0 μm, more preferably from 0.3 μm to 20.0 μm and most preferably from 0.5 μm to 15.0 μm, and/or b) a specific surface area (BET) in the range from 1.0 $m^2/g$ to 10.0 $m^2/g$ and more preferably in the range from 3.0 $m^2/g$ to 8.0 $m^2/g$ as measured by the BET nitrogen method, and/or c) a density in the range from 2.5 to 3.5 g/cm³, more preferably in the range from 2.5 to 3.2 g/cm³ and most preferably in the range from 2.6 to 3.0 g/cm³.

According to yet another embodiment of the present invention, the aqueous solution comprises at least one compound selected from the group comprising fertilizer, soil conditioner, bactericide, fungicide, insecticide, herbicide, anti-evaporation agent, anti-freezing agent, buffering agent, water softener and mixtures thereof.

According to one embodiment of the present invention, the aqueous suspension is applied on and/or into the soil in an amount from 1.0 to 100.0 kg/ha, based on the at least one earth alkali carbonate-containing material, per pH increase of 0.1 of the soil.

According to another embodiment of the present invention, the irrigation system is selected from drip irrigation, fertigation, sprinklers, pivots, distribution with booms and mixtures thereof.

As set out above, the inventive method for regulating the pH of a soil comprises at least the process steps of a), b), c) and d). In the following, it is referred to further details of the present invention and especially the foregoing steps of the inventive method for regulating the pH of a soil.

Characterization of Step a): Provision of at Least One Earth Alkali Carbonate-Containing Material According to step a) of the method of the present invention, at least one earth alkali carbonate-containing material having a weight median particle size $d_{50}$ value of ≤50.0 μm is provided.

It is appreciated that the expression "at least one" earth alkali carbonate-containing material means that one or more kinds of earth alkali carbonate-containing material can be provided in the method of the present invention.

Accordingly, it should be noted that the at least one earth alkali carbonate-containing material can be one kind of an earth alkali carbonate-containing material. Alternatively, the at least one earth alkali carbonate-containing material can be a mixture of two or more kinds of earth alkali carbonate-containing materials. For example, the at least one earth alkali carbonate-containing material can be a mixture of two or three kinds of earth alkali carbonate-containing materials, like two kinds of earth alkali carbonate-containing materials.

In one embodiment of the present invention, the at least one earth alkali carbonate-containing material is one kind of an earth alkali carbonate-containing material.

The at least one earth alkali carbonate-containing material in the meaning of the present invention refers to a filler material selected from among at least one magnesium carbonate-containing material, at least one calcium carbonate-containing material and mixtures thereof.

In one embodiment of the present invention, the at least one earth alkali carbonate-containing material is at least one calcium carbonate-containing material.

Preferably the at least one calcium carbonate-containing material is selected from ground (or natural) calcium carbonate (NGCC), a precipitated calcium carbonate (PCC) and mixtures thereof.

NGCC is understood to be a naturally occurring form of calcium carbonate, mined from sedimentary rocks such as limestone or chalk, or from metamorphic marble rocks and processed through a treatment such as grinding, screening and/or fractionizing in wet and/or dry form, for example by a cyclone or classifier. In one embodiment of the present invention, the NGCC is selected from the group comprising marble, chalk, dolomite, limestone and mixtures thereof.

By contrast, calcium carbonate of the PCC type includes synthetic calcium carbonate products obtained by carbonation of a slurry of calcium hydroxide, commonly referred to in the art as a slurry of lime or milk of lime when derived from finely divided calcium oxide particles in water or by precipitation out of an ionic salt solution. PCC may be rhombohedral and/or scalenohedral and/or aragonitic; preferred synthetic calcium carbonate or precipitated calcium carbonate comprising aragonitic, vateritic or calcitic mineralogical crystal forms or mixtures thereof.

In one embodiment of the present invention, the at least one calcium carbonate-containing material is a precipitated calcium carbonate (PCC). For example, the at least one calcium carbonate-containing material is a precipitated calcium carbonate of the calcitic mineralogical crystal form.

Alternatively, the at least one calcium carbonate-containing material is a natural ground calcium carbonate (NGCC). For example, the at least one calcium carbonate-containing material is dolomite or limestone. Preferably, the at least one calcium carbonate-containing material is limestone.

It is appreciated that the amount of calcium carbonate in the at least one calcium carbonate-containing material is at least 40.0 wt.-%, preferably at least 60.0 wt.-% and most preferably at least 80.0 wt.-%, based on the total dry weight of the at least one calcium carbonate-containing material. For example, the amount of calcium carbonate in the at least one calcium carbonate-containing material is at least 95.0 wt.-%, preferably from 97.0 to 100.0 wt.-%, more preferably from 97.0 to 99.95 wt.-% and most preferably from 97.5 to 99.5 wt.-%, based on the total dry weight of the at least one calcium carbonate-containing material.

In one embodiment of the present invention, the at least one earth alkali carbonate-containing material is at least one magnesium carbonate-containing material. For example, the at least one magnesium carbonate-containing material comprises magnesium carbonate in an amount of at least 40.0 wt.-%, preferably at least 60.0 wt.-% and most preferably at least 80.0 wt.-%, based on the total dry weight of the at least one magnesium carbonate-containing material. For example, the amount of magnesium carbonate in the at least one magnesium carbonate-containing material is at least 95.0 wt.-%, preferably from 97.0 to 100.0 wt.-%, more preferably from 97.0 to 99.95 wt.-% and most preferably from 97.5 to 99.5 wt.-%, based on the total dry weight of the at least one magnesium carbonate-containing material.

In general, it is one specific requirement of the present invention that the at least one earth alkali carbonate-containing material has a weight median particle size $d_{50}$ value of ≤50.0 μm. For example, the at least one earth alkali carbonate-containing material has a weight median particle size $d_{50}$ in the range from 0.1 μm to 50.0 μm, preferably from 0.2 μm to 30.0 μm, more preferably from 0.3 μm to 20.0 μm and most preferably from 0.5 μm to 15.0 μm.

In one embodiment of the present invention, the at least one earth alkali carbonate-containing material has a top cut ($d_{98}$) of ≤75.0 μm. For example, the at least one earth alkali carbonate-containing material has a top cut ($d_{98}$) of ≤50.0 μm, preferably of ≤30.0 μm and most preferably of ≤20.0 μm.

Additionally or alternatively, the at least one earth alkali carbonate-containing material has a BET specific surface area of from 1.0 and 10.0 m²/g as measured by the BET nitrogen method according to ISO 9277. For example, the at least one earth alkali carbonate-containing material has a specific surface area (BET) of from 3.0 to 8.0 m²/g as measured by the BET nitrogen method according to ISO 9277.

Additionally or alternatively, the at least one earth alkali carbonate-containing material has a density in the range from 2.5 to 3.5 g/cm³. For example, the at least one earth alkali carbonate-containing material has a density in the range from 2.5 to 3.2 g/cm³ and most preferably in the range from 2.6 to 3.0 g/cm³. In one embodiment of the present invention, the at least one earth alkali carbonate-containing material has a density in the range from 2.6 to 2.8 g/cm³ or in the range from 2.8 to 3.0 g/cm³.

In one embodiment of the present invention, the at least one earth alkali carbonate-containing material is preferably a calcium carbonate-containing material like a limestone having a median particle size diameter $d_{50}$ value≤50.0 μm, preferably in the range from 0.1 μm to 50.0 μm, more preferably from 0.2 μm to 30.0 μm, even more preferably from 0.3 μm to 20.0 μm and most preferably from 0.5 μm to 15.0 μm. In this case, the at least one earth alkali carbonate-containing material preferably exhibits a BET specific surface area of from 1.0 and 10.0 m²/g and most preferably of from 3.0 to 8.0 m²/g, measured using nitrogen and the BET method according to ISO 9277. Furthermore, the at least one earth alkali carbonate-containing material has a density in the range from 2.6 to 2.8 g/cm³.

In another embodiment of the present invention, the at least one earth alkali carbonate-containing material is preferably a calcium carbonate-containing material like a dolomite having a median particle size diameter $d_{50}$ value≤50.0 μm, preferably in the range from 0.1 μm to 50.0 μm, more preferably from 0.2 μm to 30.0 μm, even more preferably from 0.3 μm to 20.0 μm and most preferably from 0.5 μm to 15.0 μm. In this case, the at least one earth alkali carbonate-containing material preferably exhibits a BET specific surface area of from 1.0 and 10.0 m²/g and most preferably of from 3.0 to 8.0 m²/g, measured using nitrogen and the BET method according to ISO 9277. Furthermore, the at least one earth alkali carbonate-containing material has a density in the range from 2.8 to 3.0 g/cm³.

It is preferred that the at least one earth alkali carbonate-containing material, like the at least one calcium carbonate-containing material and/or the at least one magnesium carbonate-containing material, is a dry ground material, a material being wet ground and dried or a mixture of the foregoing materials. In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill an attrition mill, a pin mill, a hammer mill, a pulveriser, a shredder, a de-clumper, a knife cutter, or other such equipment known to the skilled man.

In case the at least one earth alkali carbonate-containing material, like the at least one calcium carbonate-containing material and/or the at least one magnesium carbonate-containing material, is a wet ground earth alkali carbonate-containing material, the grinding step may be performed under conditions such that autogenous grinding takes place and/or by horizontal ball milling, and/or other such processes known to the skilled man. The wet processed ground earth alkali carbonate-containing material thus obtained may be washed and dewatered by well known processes, e.g. by flocculation, filtration or forced evaporation prior to drying. The subsequent step of drying may be carried out in a single step such as spray drying, or in at least two steps, e.g. by applying a first heating step to the earth alkali carbonate-containing material in order to reduce the associated moisture content to a level which is not greater than about 0.5 wt.-%, based on the total dry weight of the at least one earth alkali carbonate-containing material. The residual total moisture content of the filler can be measured by the Karl Fischer coulometric titration method, desorbing the moisture in an oven at 195° C. and passing it continuously into the KF coulometer (Mettler Toledo coulometric KF Titrator C30, combined with Mettler oven DO 0337) using dry $N_2$ at 100 ml/min for 10 μmin. The residual total moisture content can be determined with a calibration curve and also a blind of 10 μmin gas flow without a sample can be taken into account. The residual total moisture content may be further reduced by applying a second heating step to the at least one earth alkali carbonate-containing material. In case said drying is carried out by more than one drying step, the first step may be carried out by heating in a hot current of air, while the second and further drying steps are preferably carried out by an indirect heating in which the atmosphere in the corresponding vessel comprises a surface treatment agent. It is also common that the at least one earth alkali carbonate-containing material is subjected to a beneficiation step (such as a flotation, bleaching or magnetic separation step) to remove impurities.

In one embodiment of the present invention, the at least one earth alkali carbonate-containing material is at least one dry ground earth alkali carbonate-containing material like at least one dry ground calcium carbonate-containing material and/or at least one dry ground magnesium carbonate-containing material. In another embodiment, the at least one earth alkali carbonate-containing material is a material being wet ground in a horizontal ball mill, and subsequently dried by using the well known process of spray drying. It is preferred that the at least one earth alkali carbonate-containing material is a dry ground material.

In one embodiment of the present invention, the at least one earth alkali carbonate-containing material is a dry ground calcium carbonate-containing material, like a dry ground limestone. For example, the at least one earth alkali carbonate-containing material is a dry ground calcium carbonate-containing material, like a dry ground limestone, having a median particle size diameter $d_{50}$ value≤50.0 μm, preferably in the range from 0.1 μm to 50.0 μm, more preferably from 0.2 μm to 30.0 μm, even more preferably from 0.3 μm to 20.0 μm and most preferably from 0.5 μm to 15.0 μm and a BET specific surface area of from 1.0 and 10.0 m²/g and most preferably of from 3.0 to 8.0 m²/g, measured using nitrogen and the BET method according to ISO 9277.

Characterization of Step b): Provision of an Aqueous Solution

According to step b) of the method of the present invention an aqueous solution is provided.

The term "aqueous solution" in the meaning of the present invention refers to a system comprising water and optionally further additives, wherein no discrete solid particles are observed in the water.

It is appreciated that the term "aqueous" solution refers to a solution comprising at least 60.0 wt.-%, preferably at least 70.0 wt.-%, more preferably at least 75.0 wt.-% and most preferably at least 80.0 wt.-%, based on the total weight of the aqueous solution, of water. For example, the aqueous solution comprises from 60.0 to 100.0 wt.-%, preferably from 70.0 to 99.9 wt.-%, more preferably from 75.0 to 99.5 wt.-% and most preferably from 80.0 to 98.0 wt.-%, based on the total weight of the aqueous solution, of water.

In one embodiment of the present invention, the aqueous solution consists of water.

The water is preferably selected from the group comprising groundwater, tap water, river or lake water, snow melt water, treated wastewater, desalinated water, drainage water and mixtures thereof.

It is appreciated that the aqueous solution can further comprise a compound typically used for improving the conditions of aqueous solutions or used for improving the growth, health and productivity of the plant on the soil. Accordingly, the compound can be selected from the group comprising fertilizer, soil conditioner, bactericide, fungicide, insecticide, herbicide, anti-evaporation agent, anti-freezing agent, buffering agent, water softener and mixtures thereof.

In one embodiment of the present invention, the aqueous solution comprises a fertilizer. Preferably, the fertilizer can be selected from a nitrogen, phosphorous, and potassium compound. For example, the fertilizer can be selected from urea, ammonium nitrate, ammonium phosphate, ammonium sulfate, urea phosphate, ammonium molybdate, potassium nitrate, potassium hydroxide, potassium phosphate, potassium sulfate, potassium chloride and mixtures thereof. Additionally or alternatively, the fertilizer can be a micronutrient fertilizer such as a micronutrient fertilizer selected from the group comprising boric acid, sodium borate, calcium borate, boron ethanol amine, borated fertilizers in solution, borated fertilizers in suspension, cobalt salt, cobalt chelate, cobalt fertilizer solution, copper salt, copper oxide, copper hydroxide, copper chelate, copper-based fertilizer, copper fertilizer solution, copper oxychloride, copper oxychloride suspension, iron salt, iron chelate, iron fertilizer solution, manganese salt, manganese chelate, manganese oxide, manganese-based fertilizer, manganese-based fertilizer solution, sodium molybdate, ammonium molybdate, molybdenum-based fertilizer, molybdenum-based fertilizer solution, zinc salt, zinc chelate, zinc oxide, zinc-based fertilizer, zinc-based fertilizer solution such as mentioned by the REGULATION (EC) No 2003/2003 OF THE EUROPEAN PARLIAMENT AND OF THE COUNCIL of 13 Oct. 2003 relating to fertilizers. The introduction of a fertilizer in the aqueous solution is advantageous for supplying nutrition to the soil or foliage of the plants.

Additionally or alternatively, the aqueous solution comprises a water softener. For example, the water softener can be selected from the group comprising monosodium citrate, monopotassium citrate and mixtures thereof. Such water softener is advantageously introduced in the aqueous solution in order to reduce the risk of clogging the nozzles of the irrigation or spraying system.

Additionally or alternatively, the aqueous solution comprises an anti-freezing agent. For example, the anti-freezing agent can be selected from the group comprising sodium chloride, potassium chloride and mixtures thereof. Such anti-freezing agent is particularly advantageously introduced in the aqueous solution in case the ambient temperature is ≤5° C.

It is appreciated that the aqueous solution may comprises one or more of the above-mentioned compounds selected from the group comprising fertilizer, soil conditioner, bactericide, fungicide, insecticide, herbicide, anti-evaporation agent, anti-freezing agent, buffering agent, water softener and mixtures thereof:

If a buffering agent is added to the aqueous solution, it is appreciated that the aqueous solution comprises the buffering agent in an amount which is not sufficient to keep the pH of the soil to be treated on a constant level. In other words, the aqueous solution comprises the buffering agent such that the pH of the soil to be treated can be increased or optimized.

It is appreciated that the expression "one or more" of said compounds means that one or more kinds of said compounds can be provided in the method of the present invention.

Accordingly, it should be noted that said compound can be one kind of a compound selected from the group comprising fertilizer, soil conditioner, bactericide, fungicide, insecticide, herbicide, anti-evaporation agent, anti-freezing agent, buffering agent and water softener. Alternatively, said compound can be a mixture of two or more kinds of compounds selected from the group comprising fertilizer, soil conditioner, bactericide, fungicide, insecticide, herbicide, anti-evaporation agent, anti-freezing agent, buffering agent and water softener. For example, said compound can be a mixture of two or three kinds of compounds selected from the group comprising fertilizer, soil conditioner, bactericide, fungicide, insecticide, herbicide, anti-evaporation agent, anti-freezing agent, buffering agent and water softener.

In one embodiment of the present invention, said compound is one kind of a compound selected from the group comprising fertilizer, soil conditioner, bactericide, fungicide, insecticide, herbicide, anti-evaporation agent, anti-freezing agent, buffering agent and water softener.

If the aqueous solution comprises one or more of a compound selected from the group comprising fertilizer, soil conditioner, bactericide, fungicide, insecticide, herbicide, anti-evaporation agent, anti-freezing agent, buffering agent and water softener, the aqueous solution comprises said compounds preferably in a total amount from 0.1 to 30.0 wt.-%, more preferably from 0.5 to 25.0 wt.-% and most preferably from 2.0 to 20.0 wt.-%, based on the total weight of the aqueous solution.

Thus, if the aqueous solution comprises one or more of a compound selected from the group comprising fertilizer, soil conditioner, bactericide, fungicide, insecticide, herbicide, anti-evaporation agent, anti-freezing agent, buffering agent and water softener, the aqueous solution comprises, preferably consists of, said compound and water. For example, the aqueous solution comprises, preferably consists of, said compound in a total amount of from 0.1 to 30.0 wt.-% and water in an amount of from 70.0 to 99.9 wt.-%, based on the total weight of the aqueous solution. Preferably, the aqueous solution comprises, preferably consists of, said compound in a total amount of from 0.5 to 25.0 wt.-% and water in an amount of from 75.0 to 99.5 wt.-%, based on the total weight of the aqueous solution. More preferably, the aqueous solution comprises, preferably consists of, said compound in an amount of from 2.0 to 20.0 wt.-% and water in an amount of from 80.0 to 98.0 wt.-%, based on the total weight of the aqueous solution.

Characterization of Step c) Contacting of the at Least One Earth Alkali Carbonate-Containing Material with the Aqueous Solution According to step c) of the inventive method, the at least one earth alkali carbonate-containing material of step a) is contacted with the aqueous solution of step b) such as to form an aqueous suspension comprising the at least one earth alkali carbonate-containing material.

Step c) of contacting the at least one earth alkali carbonate-containing material with the aqueous solution can take place under mixing and/or shaking conditions. The skilled man will adapt these mixing (such as the configuration of mixing pallets and mixing speed) and shaking conditions according to his process equipment.

In one embodiment of the present invention, the contacting of the at least one earth alkali carbonate-containing material with the aqueous solution takes place without mixing or shaking conditions.

In one embodiment of the present invention, the at least one earth alkali carbonate-containing material of step a) is contacted with the aqueous solution of step b) in one step, wherein said at least one earth alkali carbonate-containing material is preferably added in one portion to the aqueous solution or vice versa.

In another embodiment of the present invention, the at least one earth alkali carbonate-containing material of step a) is contacted with the aqueous solution of step b) in more than one step, wherein said at least one earth alkali carbonate-containing material is preferably added in about equal portions to the aqueous solution or vice versa. Alternatively, it is also possible to add the at least one earth alkali carbonate-containing material in unequal portions to the aqueous solution or vice versa, i.e. in larger and smaller portions.

It is appreciated that the formation of the aqueous suspension comprising the at least one earth alkali carbonate-containing material by contacting of the at least one earth alkali carbonate-containing material of step a) with the aqueous solution of step b) can be obtained in situ or ex situ.

The term "in situ" in the meaning of the present invention refers to the preparation of the aqueous suspension comprising the at least one earth alkali carbonate-containing material at the place where the aqueous suspension is applied on and/or into the soil and/or right before, like within 120 μmin, the aqueous suspension is applied on and/or into the soil.

Accordingly, the term "ex situ" refers to the preparation of the aqueous suspension comprising the at least one earth alkali carbonate-containing material at a place differing from the place where the aqueous suspension is applied on and/or into the soil and/or well before, like more than 120 μmin, the aqueous suspension is applied on and/or into the soil.

The aqueous suspension comprising the at least one earth alkali carbonate-containing material which is formed by contacting of the at least one earth alkali carbonate-containing material of step a) with the aqueous solution of step b) preferably comprises the at least one earth alkali carbonate-containing material in an amount from 0.001 to 78.0 wt.-%, preferably from 0.01 to 25.0 wt.-% and most preferably from 0.1 to 20.0 wt.-%, based on the total weight of the aqueous suspension.

It is preferred that the aqueous suspension comprises, preferably consists of, the aqueous solution and the at least one earth alkali carbonate-containing material. Thus, the aqueous suspension preferably comprises the at least one earth alkali carbonate-containing material in an amount from 0.001 to 30.0 wt.-% and the aqueous solution in an amount from 70.0 to 99.999 wt.-%, based on the total weight of the aqueous suspension. For example, the aqueous suspension comprises the at least one earth alkali carbonate-containing material in an amount from 0.01 to 25.0 wt.-% and the aqueous solution in an amount from 75.0 to 99.99 wt.-%, based on the total weight of the aqueous suspension. Alternatively, the aqueous suspension comprises the at least one earth alkali carbonate-containing material in an amount from 0.1 to 20.0 wt.-% and the aqueous solution in an amount from 80.0 to 99.9 wt.-%, based on the total weight of the aqueous suspension.

As already indicated above, the liquid phase of the aqueous suspension, i.e. the aqueous solution, comprises at least 60.0 wt.-%, preferably at least 70.0 wt.-%, more preferably at least 75.0 wt.-% and most preferably at least 80.0 wt.-%, based on the total weight of the liquid phase, of water. For example, the liquid phase of the aqueous suspension comprises from 60.0 to 100.0 wt.-%, preferably from 70.0 to 99.9 wt.-%, more preferably from 75.0 to 99.5 wt.-% and most preferably from 80.0 to 98.0 wt.-%, based on the total weight of the liquid phase, of water.

In one embodiment of the present invention, the liquid phase of the aqueous suspension consists of water.

Furthermore, the liquid phase of the aqueous suspension can comprise a compound typically used for improving the conditions of aqueous solutions or used for improving the growth, health and productivity of the plant on the soil, preferably a compound being selected from the group comprising fertilizer, soil conditioner, bactericide, fungicide, insecticide, herbicide, anti-evaporation agent, anti-freezing agent, buffering agent, water softener and mixtures thereof as outlined above.

If the liquid phase of the aqueous suspension comprises one or more of said compounds, the aqueous solution comprises said one or more compounds preferably in a total amount from 0.1 to 30.0 wt.-%, more preferably from 0.5 to 25.0 wt.-% and most preferably from 2.0 to 20.0 wt.-%, based on the total weight of the liquid phase.

Characterization of Step d): Applying the Aqueous Suspension on and/or into Soil According to step d) of the inventive method, the aqueous suspension obtained in step c) is applied on and/or into soil through an irrigation or spraying system, wherein the aqueous suspension is applied on and/or into the soil in an amount from 1.0 to 250 kg/ha, based on the at least one earth alkali carbonate-containing material, per pH increase of 0.1 of the soil.

It is thus one requirement that the aqueous suspension comprising the at least one earth alkali carbonate-containing material is applied on and/or into soil.

Preferably, the at least one earth alkali carbonate-containing material in form of an aqueous suspension is applied on and/or into a soil used for cultivating domesticated plants. For example, the domesticated plants such as top fruits, small-plant fruits, crops, legumes, vegetables either open field or green house, industrial crops, commodities, ornamental plants and the like.

In one embodiment of the present invention, the at least one earth alkali carbonate-containing material in form of an aqueous suspension is applied on and/or into a soil used for planting top fruits. Preferably, the top fruit is selected from pome fruits, stone fruits, citrus fruits, tropical fruits and the like. For example, the top fruit is selected from the group comprising apricot, cherry, grapes, coconut, mango, olive, plum, apple, pear, quince, citron, grapefruit, lemon, lime, orange, pomelo, tangerine, almond, cashew, chestnut, hazelnut, macadamia, pecan, pistachio, walnut, pineapple, banana, breadfruit, durian, ensete, fig, jackfruit, papaya, passion fruit and the like.

In one embodiment of the present invention, the at least one earth alkali carbonate-containing material in form of an aqueous suspension is applied on and/or into a soil used for cultivating small-plant fruits. Preferably, the small-plant fruits are berries. For example, the small-plant fruit is selected from the group comprising raspberry, cranberry, blackberry, blueberry, huckleberry, currant, grape, melon, strawberry and the like.

In one embodiment of the present invention, the at least one earth alkali carbonate-containing material in form of an aqueous suspension is applied on and/or into a soil used for cultivating crop. Preferably, the crop is selected from the group comprising barley, little barley, millet like finger millet, pearl millet, proso millet and foxtail millet, corn, maize, maygrass, oats, rice, rye, sorghum, soybean, spelt, teff, triticale, wheat like einkorn wheat, durum wheat and bread wheat, amaranth, buckwheat, Job's tears, quinoa, sunflower, sumpwheat, poppy seeds, sesame and the like.

In one embodiment of the present invention, the at least one earth alkali carbonate-containing material in form of an aqueous suspension is applied on and/or into a soil used for cultivating legumes. Preferably, the legumes is selected from the group comprising azuki bean, soybean, chickpea, pinto bean, kidney bean, lentil, runner bean, lima bean, velvet bean, mung bean, pea, peanut, jicama and the like.

In one embodiment of the present invention, the at least one earth alkali carbonate-containing material in form of an aqueous suspension is applied on and/or into a soil used for cultivating vegetables. Preferably, the vegetable is cultivated in the open field or in the green house. For example, the vegetable is selected from the group comprising eggplant, pepper, pumpkin, zucchini, tomato, beet, carrot, parsnip, radish, turnip, cassava, potato, salad, sweet potato, sugarcane, alfalfa and the like.

In one embodiment of the present invention, the at least one earth alkali carbonate-containing material in form of an aqueous suspension is applied on and/or into a soil used for cultivating industrial crops. For example, the industrial crop can be an oil-producing plant. Preferably, the industrial crop is selected from the group comprising olive, peanut, soybean, canola, coconut, corn, cottonseed, poppy, palm, rapeseed, safflower, sesame, sunflower, flaxseed, chia seed, acai palm, flax, potato, cotton, sugarcane, sugar beet and the like.

In one embodiment of the present invention, the at least one earth alkali carbonate-containing material in form of an aqueous suspension is applied on and/or into a soil used for cultivating commodities. Preferably, the commodity is selected from the group comprising alfalfa, clover, grasses for hay and silage, olive, peanut, soybean, canola, coffee, cacao, tea, tobacco, cotton, flax, henequen, jute, kenaf, hemp and the like.

In one embodiment of the present invention, the at least one earth alkali carbonate-containing material in form of an aqueous suspension is applied on and/or into a soil used for cultivating ornamental plants. Preferably, the ornamental plant is selected from houseplants and landscaping plants.

It is appreciate that the at least one earth alkali carbonate-containing material in form of an aqueous suspension is applied on and/or into the soil to be treated at a low application rate of calcium carbonate containing material. In particular, the at least one earth alkali carbonate-containing material in form of an aqueous suspension is applied on and/or into the soil to be treated at an application rate of earth alkali carbonate-containing material that is below the application rate of prior art methods.

Thus, the aqueous suspension comprising the at least one earth alkali carbonate-containing material is applied on and/or into the soil in an amount from 1.0 to 250.0 kg/ha per pH increase of 0.1 of the soil. It is to be noted that the application rate is based on the at least one earth alkali carbonate-containing material in the aqueous suspension.

In one embodiment of the present invention, the aqueous suspension comprising the at least one earth alkali carbonate-containing material is applied on and/or into the soil in an amount from 1.0 to 100.0 kg/ha, based on the at least one earth alkali carbonate-containing material, per pH increase of 0.1 of the soil. For example, the aqueous suspension comprising the at least one earth alkali carbonate-containing material is applied on and/or into the soil in an amount from 1.0 to 75.0 kg/ha, based on the at least one earth alkali carbonate-containing material, per pH increase of 0.1 of the soil.

The soil to be treated typically has a pH, before applying the at least one earth alkali carbonate-containing material, of in-equation (I) and more preferably of in-equation (Ia), $$pH \leq 7.2 \tag{I}$$

$$3.5 < pH \leq 7.0 \tag{Ia}$$

It is appreciated that the pH1 of the soil to be treated is regulated by the instant method. Specifically, the pH of the soil to be treated is optimized or improved by the instant method.

In particular, the optimization or improvement is accomplished when the soil to be treated has a pH, after applying the at least one earth alkali carbonate-containing material, of in-equation (II) and more preferably of in-equation (IIa), $$pH \leq 7.2 \tag{II}$$

$$5.1 < pH \leq 7.2 \tag{IIa}$$

wherein the pH is determined after 2, 4, 6, 8, 24 and/or 52 weeks of applying the at least one earth alkali carbonate-containing material on and/or into the soil.

For example, the optimization or improvement is accomplished when the soil to be treated has a pH, after applying the at least one earth alkali carbonate-containing material, of in-equation (II) and more preferably of in-equation (IIa), $$pH \leq 7.2 \tag{II}$$

$$5.1 < pH \leq 7.2 \tag{IIa}$$

wherein the pH is determined after 2, 4, 6, 8, 24 or 52 weeks of applying the at least one earth alkali carbonate-containing material on and/or into the soil.

Alternatively, the optimization or improvement is accomplished when the soil to be treated has a pH, after applying the at least one earth alkali carbonate-containing material, of in-equation (II) and more preferably of in-equation (IIa), $$pH \leq 7.2 \tag{II}$$

$$5.1 < pH \leq 7.2 \tag{IIa}$$

wherein the pH is determined after 2, 4, 6, 8, 24 and 52 weeks of applying the at least one earth alkali carbonate-containing material on and/or into the soil.

Preferably, the optimization or improvement is accomplished when the soil has a pH, before applying the at least one earth alkali carbonate-containing material, of in-equation (I) and more preferably of in-equation (Ia), $$pH \leq 7.2 \tag{I}$$

$$3.5 < pH \leq 7.0 \tag{Ia}$$

and a pH, after applying the at least one earth alkali carbonate-containing material, of in-equation (II) and more preferably of in-equation (IIa), $$pH \leq 7.2 \tag{II}$$

$$5.1 < pH \leq 7.2 \tag{IIa}$$

wherein the pH is determined after 2, 4, 6, 8, 24 and/or 52 weeks of applying the at least one earth alkali carbonate-containing material on and/or into the soil.

In this regard, it is to be noted that the pH of the soil to be treated after applying the at least one earth alkali carbonate-containing material does not drop below the pH of the same soil measured before applying the at least one earth alkali carbonate-containing material. Preferably, the pH of the soil to be treated after applying the at least one earth alkali carbonate-containing material does not drop below the pH of the same soil, measured before applying the at least one earth alkali carbonate-containing material in a period of 2, 4, 6, 8, 24 and/or 52 weeks after applying of the at least one earth alkali carbonate-containing material on and/or into the soil. For example, the pH of the soil to be treated after applying the at least one earth alkali carbonate-containing material does not drop below the pH of the same soil, measured before applying the at least one earth alkali carbonate-containing material in a period of 2, 4, 6, 8, 24 and 52 weeks after applying of the at least one earth alkali carbonate-containing material on and/or into the soil.

In one embodiment of the present invention, the ratio pH (after)/pH (before) of the soil to be treated is in the range of 1.0 to 1.4, preferably in the range of 1.05 to 1.2 and most preferably in the range of 1.05 to 1.1, wherein pH (after) is the pH determined after 2, 4, 6, 8, 24 and/or 52 weeks of applying the at least one earth alkali carbonate-containing material pH (before) is the pH before applying the at least one earth alkali carbonate-containing material.

For example, the ratio pH (after)/pH (before) of the soil to be treated is in the range of 1.0 to 1.4, preferably in the range of 1.05 to 1.2 and most preferably in the range of 1.05 to 1.1, wherein pH (after) is the pH determined after 2, 4, 6, 8, 24 or 52 weeks of applying the at least one earth alkali carbonate-containing material pH (before) is the pH before applying the at least one earth alkali carbonate-containing material.

Alternatively, the ratio pH (after)/pH (before) of the soil to be treated is in the range of 1.0 to 1.4, preferably in the range of 1.05 to 1.2 and most preferably in the range of 1.05 to 1.1, wherein pH (after) is the pH determined after 2, 4, 6, 8, 24 and 52 weeks of applying the at least one earth alkali carbonate-containing material pH (before) is the pH before applying the at least one earth alkali carbonate-containing material.

One further requirement for regulating the pH of the soil is that the aqueous suspension comprising the at least one earth alkali carbonate-containing material is applied on and/or into the soil through an irrigation or spraying system.

In one embodiment of the present invention, the aqueous suspension comprising the at least one earth alkali carbonate-containing material is applied on or into the soil through an irrigation or spraying system. Alternatively, the aqueous suspension comprising the at least one earth alkali carbonate-containing material is applied on and into the soil through an irrigation or spraying system. For example, the aqueous suspension comprising the at least one earth alkali carbonate-containing material is applied on the soil through an irrigation or spraying system.

In general, the aqueous suspension comprising the at least one earth alkali carbonate-containing material can be applied on and/or into the soil with any conventional irrigation or spraying system that is suitable for distributing the aqueous suspension on the soil and/or injecting the aqueous suspension into the soil. For example, the irrigation system is selected from drip irrigation, fertigation, sprinklers, pivots, distribution with booms and mixtures thereof, or other such equipment known to the skilled man.

It is appreciated that the irrigation or spraying system can be installed on any mobile or non-mobile system suitable for carrying the irrigation or spraying system such as for applying the aqueous suspension comprising the at least one earth alkali carbonate-containing material on and/or into the soil to be treated. For example, a mobile system is selected from agricultural or horticultural vehicles, like cars, trucks and planes.

In view of the very good results obtained, one aspect of the present invention relates to the use of at least one earth alkali carbonate-containing material having a weight median particle size $d_{50}$ value of ≤50.0 µm for optimizing or improving the pH of a soil. It is required that the at least one earth alkali carbonate-containing material is in form of an aqueous suspension comprising the at least one earth alkali carbonate-containing material and the at least one earth alkali carbonate-containing material is applied on and/or into the soil in an amount from 1.0 to 250.0 kg/ha per pH increase of 0.1 of the soil.

With regard to the definition of the at least one earth alkali carbonate-containing material the aqueous suspension comprising the at least one earth alkali carbonate-containing material, the soil, the application rate, application system and preferred embodiments thereof, reference is made to the comments provided above when further discussing method steps a), b), c) and d).

It is appreciated that the optimization or improvement is accomplished when the soil has a pH, before applying the at least one earth alkali carbonate-containing material, of in-equation (I) and more preferably of in-equation (Ia), $$pH \leq 7.2 \quad (I),$$

$$3.5 < pH \leq 7.0 \quad (Ia),$$

and a pH, after applying the at least one earth alkali carbonate-containing material, of in-equation (II) and more preferably of in-equation (IIa), $$pH \leq 7.2 \quad (II),$$

$$5.1 < pH \leq 7.2 \quad (IIa),$$

wherein the pH is determined after 2, 4, 6, 8, 24 and/or 52 weeks of applying the at least one earth alkali carbonate-containing material on and/or into the soil.

For example, the optimization or improvement is accomplished when the soil has a pH, before applying the at least one earth alkali carbonate-containing material, of in-equation (I) and more preferably of in-equation (Ia), $$pH \leq 7.2 \quad (I),$$

$$3.5 < pH \leq 7.0 \quad (Ia),$$

and a pH, after applying the at least one earth alkali carbonate-containing material, of in-equation (II) and more preferably of in-equation (IIa), $$pH \leq 7.2 \quad (II),$$

$$5.1 < pH \leq 7.2 \quad (IIa),$$

wherein the pH is determined after 2, 4, 6, 8, 24 or 52 weeks of applying the at least one earth alkali carbonate-containing material on and/or into the soil.

Alternatively, the optimization or improvement is accomplished when the soil has a pH, before applying the at least one earth alkali carbonate-containing material, of in-equation (I) and more preferably of in-equation (Ia), $$pH \leq 7.2 \quad (I),$$

$$3.5 < pH \leq 7.0 \quad (Ia),$$

and a pH, after applying the at least one earth alkali carbonate-containing material, of in-equation (II) and more preferably of in-equation (IIa), $$pH \leq 7.2 \quad (II),$$

$$5.1 < pH \leq 7.2 \quad (IIa),$$

wherein the pH is determined after 2, 4, 6, 8, 24 and 52 weeks of applying the at least one earth alkali carbonate-containing material on and/or into the soil.

It is thus appreciated that the increase or optimization of the soil lasts for a sufficient period of time, preferably a period of at least 6 months. For example, the increase or optimization of the soil lasts for a period of at least 7 months, more preferably at least 8 months, even more preferably at least 9 months, still more preferably at least 10 months and most preferably at least 11 months, like a period of at least 12 months.

In view of the very good results obtained by applying the aqueous suspension comprising the at least one earth alkali carbonate-containing material on and/or into the soil by using an irrigation or spraying system, a further aspect of the present invention refers to the use of an irrigation or spraying system for the application of an aqueous suspension comprising at least one earth alkali carbonate-containing material on and/or into soil in order to optimize or improve the pH of the soil. It is preferred that the irrigation system is selected from drip irrigation, fertigation, sprinklers, pivots, distribution with booms and mixtures thereof.

With regard to the definition of the at least one earth alkali carbonate-containing material the aqueous suspension comprising the at least one earth alkali carbonate-containing material, the soil, the application rate, application system and preferred embodiments thereof, reference is made to the comments provided above when further discussing method steps a), b), c) and d).

The following examples may additionally illustrate the invention but are not meant to restrict the invention to the exemplified embodiments. The examples below show the reduced application rate of the at least one earth alkali carbonate-containing material and the optimized and/or improved pH of a soil treated with an aqueous suspension comprising at least one calcium carbonate-containing material:

EXAMPLES

Measurement Methods

The following measurement methods are used to evaluate the parameters given in the examples and claims.
Particle Size Distribution (Mass % Particles with a Diameter<X) and Weight Median Diameter ($d_{50}$) of a Particulate Material As used herein and as generally defined in the art, the "$d_{50}$" value is determined based on measurements made by using a Sedigraph™ 5100 of Micromeritics Instrument Corporation and is defined as the size at which 50% (the median point) of the particle volume or mass is accounted for by particles having a diameter equal to the specified value.

The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

BET Specific Surface Area of a Material

Throughout the present document, the specific surface area (in $m^2/g$) of the earth alkali carbonate-containing material is determined using the BET method (using nitrogen as adsorbing gas), which is well known to the skilled man (ISO 9277:1995). The total surface area (in $m^2$) of the earth alkali carbonate-containing material is then obtained by multiplication of the specific surface area and the mass (in g) of the earth alkali carbonate-containing material prior to treatment.

Density

The density is measured according to Norm DIN 66137-2: December 2004 using helium gas pycnometry with an AccuPyc 1330 gas pycnometer from Micromeritics, wherein the helium gas is of 99.995% purity (helium gas 4.5 grade). AccuPyc calibration standard from Micromeritics, serial no. 3059 was used.

pH

The free acidity, relating to the H+ in the soil solution, was determined by the water pH as follows:

For the pH assessment, soil samples were taken from 5 to 10 cm depth. The soil samples were thoroughly mixed before taking 30 ml of volume of soil subsample. The subsample was placed in a plastic container together with 30 ml of distilled water and the soil-water mixture was thoroughly mixed. The resulting soil/water mixture thus equates to a 1:1 soil to water ratio on a volume basis. Subsequently, the container was closed and then shaken for about 25 times. After a settling of the soil particles for about 10 to 15 μminutes, a pH meter (model Mettler Toledo F20—FiveEasy), calibrated with 4.0 and 7.0 standard buffer solutions, AC or battery operated with reproducibility to at least 0.05 pH units, was inserted into the upper most portion of the solution and the pH was digitally recorded.

Example 1

One walnut orchard in Escalon, Calif., was chosen as test site. The site suffered from high acidity and poor water penetration; mean pH was about 4.9-5.1. To balance this acidity the grower used in the past 2 years about 2 tons of dolomite powder per acre, i.e. about 4 tons/ha in total. After these two applications the results showed a slight increase in pH, from 5.0 to 5.2, which dropped again to 5 after 6 months from the time of application.

Furthermore, this standard product is applied on the top soil and reacts slowly with the acidity and moisture of the soil. Due to the uneven particle size and the high presence of dust it could happen that a significant amount of product is lost with the wind and is thus not available for treating the soil.

A plot of about 24 ha (60 acres) was defined as test site containing about 6 000 trees of which about 5% were suffering poor plant health. Water source was supplied by snow melt from the South San Joaquin Irrigation District Canal with pH 7 and EC, (electrical conductivity) of 2.7 S/m, very low mineral content.

It was decided to apply 280.2 kg/ha of a calcium carbonate-containing material (available as Agrocarb® 100 from Omya Inc., USA) in form of an aqueous suspension on the test site. For distributing the aqueous suspension, an available irrigation system for applying powder solution grade of Gypsum or any liquid fertilizer/amendment was used. In particular, the water is introduced into the bottom of a 180 US gal lqd (about 680 liters) capacity container mounted on a trailer. Subsequently, the calcium carbonate containing material is added in situ to the water, no mixing was involved and then the obtained slurry was discharged through gravity into a basin where canal water enters. Subsequently, the aqueous suspension was pumped onto the soil of the test site. In order to ensure the suspension properties, the water was taken from sprinklers at farthest distance from the pump. The irrigation system consumed about 340 kg (750 lb) per hour of the aqueous suspension comprising the calcium carbonate containing material. Twenty four hours were required to irrigate and apply about 280.2 kg/ha (250 lb/a) on 24 ha (60 acres) on the soil. The soil samples from the test site were tested at 2, 4, 6 and 8 week intervals.

From the results given in FIG. 1, it can be gathered that the pH of the soil sharply increases within 2 weeks after applying of the aqueous suspension comprising the calcium carbonate-containing material. The pH stayed stable for the remaining 6 weeks of the test period.

Example 2

Test 1

The aqueous suspension comprising the calcium carbonate-containing material was also tested on test sites cultivating corn.

The experimental design was a randomized complete Block with 8 replications. For distributing the aqueous suspension, an available arrangement of bar for applying herbicide solutions on the soil was used on every singly block for applying the aqueous suspension comprising the calcium carbonate-containing material.

The treatments were:
1=Untreated,
2=about 2 240 kg/ha (2 000 lbs/a) of regularly used ground dolomitic limestone (reference "dolomitic aglime", available from a local producer), and
3=about 1 537 liters/ha (166 gal/a) of the aqueous suspension comprising a calcium carbonate-containing material (available as Top Flow 130 from Omya Inc., USA).

The pH was determined in water at Waters lab in Camilla, Ga., before applying the aqueous suspension comprising a calcium carbonate-containing material or the standard reference on soil (point 1) as well as every 2 (point 2), 4 (point 3), 8 (point 4), 12 (point 5) and 16 weeks (point 6) after applying the aqueous suspension comprising a calcium carbonate-containing material and the standard reference on the soil.

Figure 2:
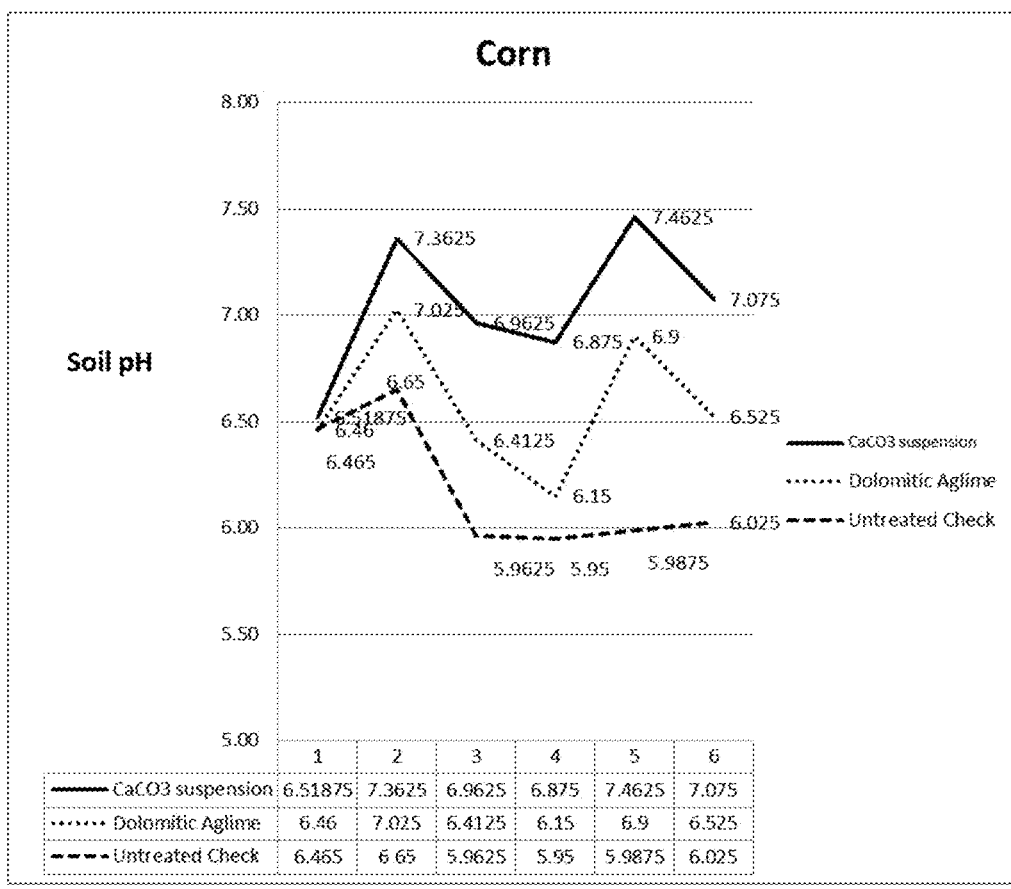

From FIG. 2, the trend of the soil pH after the application of the aqueous suspension comprising a calcium carbonate-containing material (continuous line) and the standard reference (dotted line) on soil pH can be gathered.

Two weeks (point 2) after the application of the different products, the pH of the soil increased for both treatments, showing a clear effect of pH spike.

After four weeks (point 3) the untreated test sites showed a sharp pH decrease, same did the treatment 2 (i.e. reference), where the pH level was lower than the starting pH, i.e. the pH before applying the soil conditioner.

Treatment number 3 (i.e. the aqueous suspension comprising a calcium carbonate-containing material) also showed a pH decrease after four weeks (point 3) of treatment, in comparison to the pH measured after 2 weeks (point 2), but the determined pH was higher than the starting pH, i.e. the pH before applying the pH soil conditioner (point 1).

After 16 weeks (point 6) the pH of plots treated with the inventive aqueous suspension comprising a calcium carbonate-containing material showed a difference vs. either the dolomitic aglime (i.e. +0.55 pH) or the untreated check (i.e. +1.050 pH).

Test 2

The aqueous suspension comprising the calcium carbonate-containing material was also tested on test sites cultivating cotton.

The experiments were conducted as described for Test 1 above, with the exception that the treatments 1, 2 and 3 were performed on cotton.

Figure 3:
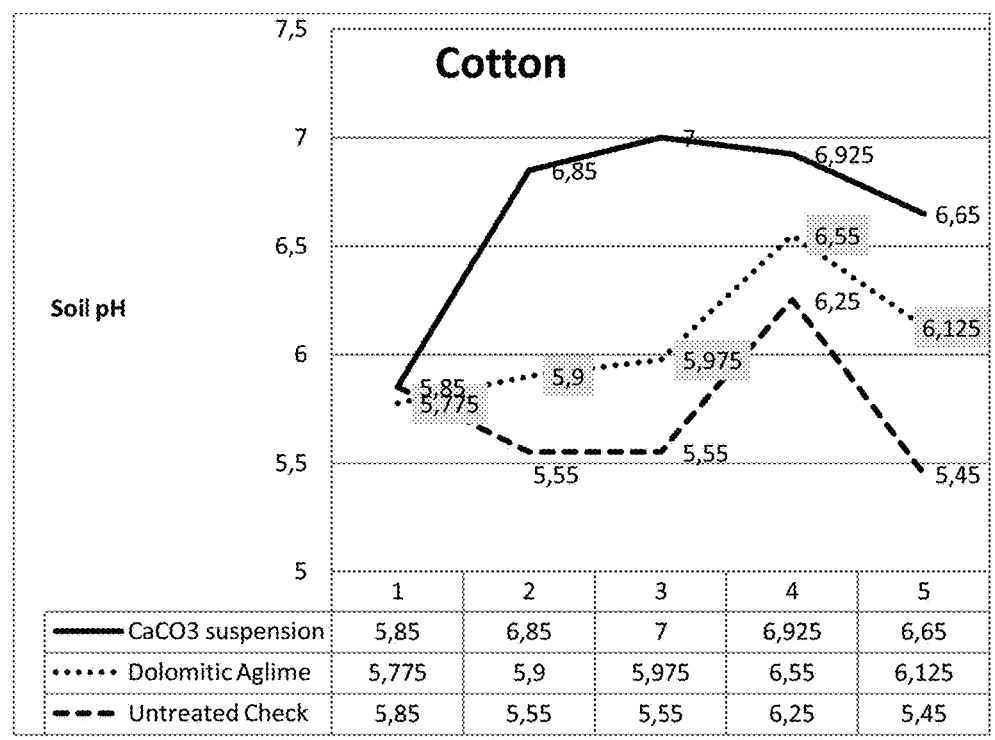

From FIG. 3, the trend of the soil pH after 2 (point 2), 4 (point 3), 8 (point 4) and 12 (point 5) weeks of the application of the aqueous suspension comprising a calcium carbonate-containing material (continuous line) and the standard reference (dotted line) on soil pH can be gathered.

Two weeks (point 2) after the application of the different products, the treatment number 3 (i.e. the aqueous suspension comprising a calcium carbonate-containing material) reacted faster with the soil water when compared to the reference treatment (i.e. treatment number 2) and the untreated sample. Even 12 weeks (point 5) after the application of the aqueous suspension comprising a calcium carbonate-containing material (treatment number 3), the pH of this sample was above the pH of the reference treatment (i.e. +0.525 pH) and the untreated sample (i.e. +1.2 pH).

Test 3

The aqueous suspension comprising the calcium carbonate-containing material was also tested on test sites cultivating peanuts.

The experiments were conducted as described for Test 1 above with the exception that the treatments 1, 2 and 3 were performed on peanuts.

Figure 4:
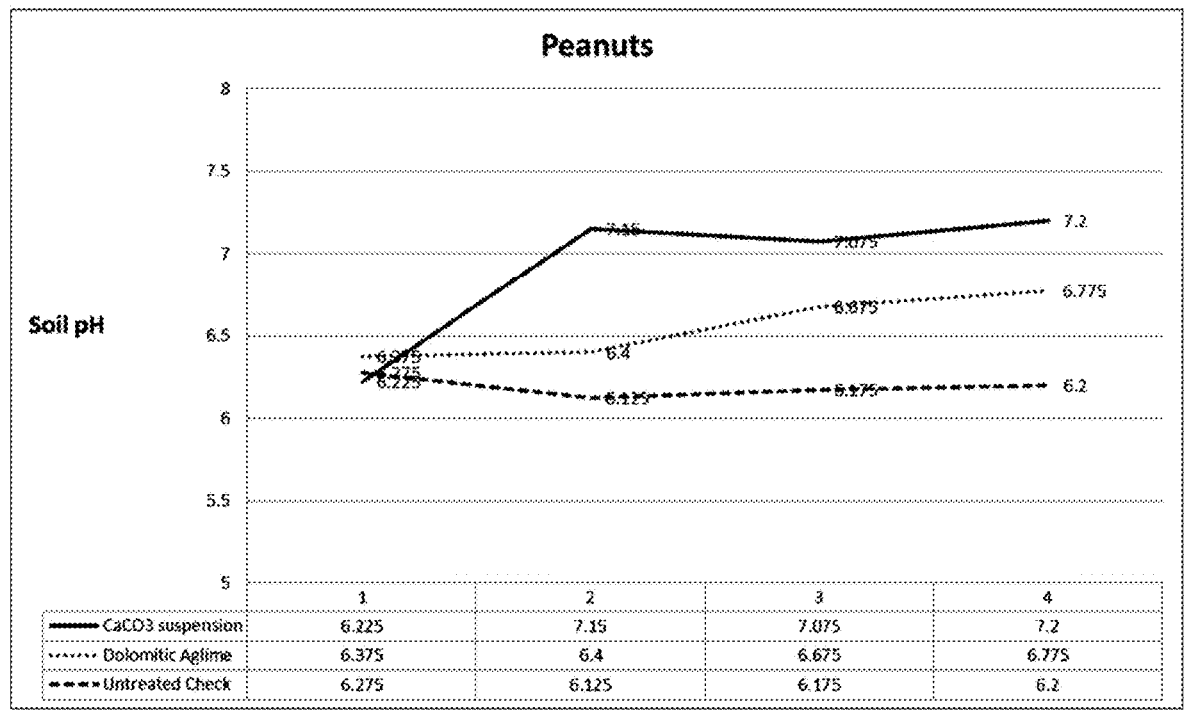

From FIG. 4, the trend of the soil pH after 2 (point 2), 4 (point 3) and 8 (point 4) weeks of the application of the aqueous suspension comprising a calcium carbonate-containing material (continuous line) and the standard reference (dotted line) on soil pH can be gathered.

Even starting from a lower pH, (i.e. pH 6.225 for treatment number 3 vs. 6.375 for treatment number 2, point 1) the aqueous suspension comprising a calcium carbonate-containing material showed a faster reaction and conditioned the soil from the earliest stage of its application. All the pH measurements carried out after 2 (point 2), 4 (point 3), and 8 (point 4) weeks showed that the test sites treated with the aqueous suspension comprising a calcium carbonate-containing material staid above pH 7, whilst the reference treatment was slower in the reaction and never reached that pH level.

As a result, it can be concluded from Tests 1 to 3 that the treatment of a soil by using an aqueous suspension comprising a calcium carbonate-containing material and which has been applied on the soil by using a spraying or irrigation system showed in every trial a better performance when compared to the reference samples. Indeed its unique formulation and the better distribution of the soil obtained by the liquid application allowed the soil plots to reach pH levels that were not reached by the common practice.

TABLE A

Field trial on acid soil (Vietnam)

| Field trials plots | Treatments | Average pH before treatment | Rate (kg/ha) | Average pH after treatment | Weeks after treatment |
|---|---|---|---|---|---|
| Ploughed plots | GCC slurry | 5.4 | 88 | 6.6 | 4 |
| | Hydrated lime | 5.4 | 2500 | 5.6 | 4 |
| Unloughed plots | GCC slurry | 5.2 | 88 | 6.6 | 4 |
| | Hydrated lime | 5.2 | 2500 | 5.4 | 4 |

GCC slurry refers to a calcium carbonate slurry with 76 wt % of solid content, d50 of 0.5 μm and a top cut of 4 μm, which was applied by a fertilizer slurry application tanker. Hydrated lime was a commercially available hydrated lime with 200 μmesh (75 μm) of 94%, and the powder was distributed manually on the field. Measurement of pH was done directly in the field with a soil tester from Takemura Electric Works LTD. model DM/15.

The invention claimed is:

1. A method for regulating the pH of a soil, the method comprising:
applying an aqueous suspension comprising 0.001 to 30 wt.-% at least one earth alkali carbonate-containing material that is limestone, based on the weight of the aqueous suspension and comprising 0.1 to 30 wt.-% of a water softener based on the weight of the aqueous suspension, on and/or into soil through an irrigation or spraying system, in an amount from 1.0 to 100.0 kg/ha, based on the at least one earth alkali carbonate-containing material, per pH increase of 0.1 of the soil, to regulate the pH of the soil, wherein the at least one earth alkali carbonate-containing material comprises natural ground calcium carbonate, wherein a ratio of the pH of the soil at 2, 4, 6, 8, 24 and/or 52 weeks after applying the at least one earth alkali carbonate-containing material to the pH of the soil before applying the at least one earth alkali carbonate-containing material is 1.05 to 1.4, and the at least one earth alkali carbonate-containing material comprises:
a) a weight median particle size diameter $d_{50}$ in the range from 0.3 μm to 20.0 μm,
b) a specific surface area (BET) in the range from 1.0 m$^2$/g to 10.0 m$^2$/g as measured by a BET nitrogen method, and
c) a density in the range from 2.5 to 3.5 g/cm$^3$.

2. The method of claim 1, wherein the at least one earth alkali carbonate-containing material comprises:
a) a weight median particle size diameter $d_{50}$ in the range from 0.5 μm to 15.0 μm,
b) a specific surface area (BET) in the range from 3.0 m$^2$/g to 8.0 m$^2$/g as measured by the BET nitrogen method, and
c) a density in the range from 2.6 to 3.0 g/cm$^3$.

3. The method of claim 1, wherein the aqueous suspension comprises at least one compound selected from the group consisting of fertilizer, soil conditioner, bactericide, fungicide, insecticide, herbicide, anti-evaporation agent, anti-freezing agent, buffering agent, and any mixture thereof.

4. The method of claim 1, wherein the irrigation system is selected from the group consisting of drip irrigation, fertigation, sprinklers, pivots, distribution with booms, and any mixture thereof.

5. The method of claim 1, wherein the soil before applying the at least one earth alkali carbonate-containing material has a pH≤7.2, and after applying the at least one earth alkali carbonate-containing material has a pH≤7.2, wherein the pH is determined after 2, 4, 6, 8, 24 and/or 52 weeks of applying the at least one earth alkali carbonate-containing material on and/or into the soil.

6. The method of claim 1, wherein the soil has pH, before applying the at least one earth alkali carbonate-containing material of 3.5<pH≤7.0, and a pH, after applying the at least one earth alkali carbonate-containing material of 5.1<pH≤7.2, wherein the pH is determined after 2, 4, 6, 8, 24 and/or 52 weeks of applying the at least one earth alkali carbonate-containing material on and/or into the soil.

7. The method of claim 1, wherein the at least one earth alkali carbonate-containing material is applied on and/or into a soil for domesticated plants, top fruits, small-plant fruits, crops, legumes, vegetables either open field or green house, industrial crops, commodities, or ornamental plants.

8. The method of claim 1, wherein a ratio of the pH of the soil at 2, 4, 6, 8, 24 and/or 52 weeks after applying the at least one earth alkali carbonate-containing material to the pH of the soil before applying the at least one earth alkali carbonate-containing material is 1.05 to 1.2.

9. The method of claim 1, wherein the pH of the soil at 8 weeks after applying the at least one earth alkali carbonate-containing material is higher than the pH of the soil before applying the at least one earth alkali carbonate-containing material.

10. The method of claim 1, wherein the pH of the soil at 12 weeks after applying the at least one earth alkali carbonate-containing material is higher than the pH of the soil before applying the at least one earth alkali carbonate-containing material.

11. The method of claim 1, wherein the pH of the soil at 16 weeks after applying the at least one earth alkali carbonate-containing material is higher than the pH of the soil before applying the at least one earth alkali carbonate-containing material.

12. A method for regulating the pH of a soil, the method comprising:
applying an aqueous suspension comprising at least one earth alkali carbonate-containing material that is limestone and comprising 0.1 to 30 wt.-% of a water softener based on the weight of the aqueous suspension, on and/or into soil through an irrigation or spraying system, in an amount from 1.0 to 75 kg/ha, based on the at least one earth alkali carbonate-containing material, per pH increase of 0.1 of the soil, to regulate the pH of the soil, wherein the at least one earth alkali carbonate-containing material comprises natural ground calcium carbonate, wherein a ratio of the pH of the soil at 8, 24 and/or 52 weeks after applying the at least one earth alkali carbonate-containing material to the pH of the soil before applying the at least one earth alkali carbonate-containing material is 1.05 to 1.1, and the at least one earth alkali carbonate-containing material has:
a) a weight median particle size diameter $d_{50}$ in the range from 0.3 μm to 20.0 μm,
b) a specific surface area (BET) in the range from 1.0 m$^2$/g to 10.0 m$^2$/g as measured by a BET nitrogen method, and
c) a density in the range from 2.5 to 3.5 g/cm$^3$.

13. The method of claim 1, wherein the water softener comprises monosodium citrate, monopotassium citrate and mixtures thereof.

14. The method of claim 12, wherein the water softener comprises monosodium citrate, monopotassium citrate and mixtures thereof.

15. The method of claim 1, wherein the weight median particle size diameter $d_{98}$ is less than or equal to 75 μm.

16. The method of claim 15, wherein the weight median particle size diameter $d_{98}$ is less than or equal 20 μm.

17. The method of claim 12, wherein the weight median particle size diameter $d_{98}$ is less than or equal to 75 μm.

18. The method of claim 17, wherein the weight median particle size diameter $d_{98}$ is less than or equal 20 μm.

19. The method of claim 1, wherein the aqueous suspension is 2 to 20 wt.-% of the water softener.

* * * * *